(12) United States Patent
Huang (10) Patent No.: US 10,979,666 B2
(45) Date of Patent: *Apr. 13, 2021

(54) ASYMMETRIC VIDEO CONFERENCING SYSTEM AND METHOD

(71) Applicant: NANNING FUGUI PRECISION INDUSTRIAL CO., LTD., Nanning (CN)

(72) Inventor: Yung-Chang Huang, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/795,819

(22) Filed: Feb. 20, 2020

(65) Prior Publication Data

US 2020/0195885 A1 Jun. 18, 2020

Related U.S. Application Data

(63) Continuation of application No. 16/596,241, filed on Oct. 8, 2019, now Pat. No. 10,645,339, which is a (Continued)

(51) Int. Cl.
*H04N 7/14* (2006.01)
*H04N 7/15* (2006.01)
(Continued)

(52) U.S. Cl.
CPC ......... *H04N 7/142* (2013.01); *G06K 9/00228* (2013.01); *H04N 5/23238* (2013.01); *H04N 7/15* (2013.01)

(58) Field of Classification Search
USPC ........................................... 348/14.01–14.08
See application file for complete search history.

(56) References Cited

U.S. PATENT DOCUMENTS

2011/0292193 A1 12/2011 Wang et al.
2012/0249797 A1* 10/2012 Haddick ................. G06F 3/016
348/158
(Continued)

FOREIGN PATENT DOCUMENTS

CN 108347557 A 7/2018
TW 201039633 A 11/2010
(Continued)

*Primary Examiner* — Maria El-Zoobi
(74) *Attorney, Agent, or Firm* — ScienBiziP, P.C.

(57) ABSTRACT

An asymmetric video conferencing system comprises a panoramic video conferencing device in a first location and a head mounted video conferencing device in a second location. The panoramic video conferencing device acquires panoramic images of multiple participants via a 360 degree camera, identifies a face or other region of interest (ROI) in the panoramic images, and captures video data of the ROI. To reduce bandwidth utilized, the ROI video data is transmitted to the head mounted video conferencing device used by a remote participant, who can command alternative views and audio from the first location. Images and audio of the remote participant can be transmitted to the first location for viewing and hearing by the multiple participants, enabling virtual face-to-face discussions. A method implementing the system is also disclosed herein.

5 Claims, 6 Drawing Sheets

Related U.S. Application Data continuation of application No. 16/183,648, filed on Nov. 7, 2018, now Pat. No. 10,491,857.

(51) Int. Cl.
*G06K 9/00* (2006.01)
*H04N 5/232* (2006.01)

(56) References Cited

U.S. PATENT DOCUMENTS

| | | | | |
|---|---|---|---|---|
| 2013/0182064 A1* | 7/2013 | Muench | ................ | H04S 5/00 |
| | | | | 348/14.16 |
| 2014/0333531 A1* | 11/2014 | Phang | ............ | H04N 21/4316 |
| | | | | 345/156 |
| 2017/0187987 A1* | 6/2017 | Mukai | ................ | H04N 5/225 |
| 2018/0206038 A1* | 7/2018 | Tengelsen | ............ | H04S 7/303 |
| 2019/0141252 A1* | 5/2019 | Pallamsetty | ....... | H04N 5/23238 |

FOREIGN PATENT DOCUMENTS

| | | |
|---|---|---|
| TW | 201330618 A | 7/2013 |
| TW | 201813372 A | 4/2018 |

* cited by examiner

ASYMMETRIC VIDEO CONFERENCING SYSTEM AND METHOD

CROSS-REFERENCE TO RELATED APPLICATIONS

The application is a continuation of and claims priority under 35 U.S.C. § 120 to U.S. application Ser. No. 16/596,241, filed on Oct. 8, 2019, which is a continuation of U.S. application Ser. No. 16/183,648, filed on Nov. 7, 2018, the entire contents of which are incorporated by reference herein.

FIELD

The subject matter herein generally relates to video conferencing.

BACKGROUND

The traditional 360-degree video conferencing device can display a panoramic image or display a small image of a speaker, but if all the people participating in the video conference are to be viewed, the panoramic image needs to be transmitted, which is more bandwidth-consuming. In addition, there is no face-to-face intimacy in video conferencing.

Thus, there is room for improvement within the art.

BRIEF DESCRIPTION OF THE DRAWINGS

Implementations of the present technology will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one". The term "comprising", when utilized, means "including, but not necessarily limited to"; it specifically indicates open-ended inclusion or membership in a so-described combination, group, series, and the like.

Figure 1:
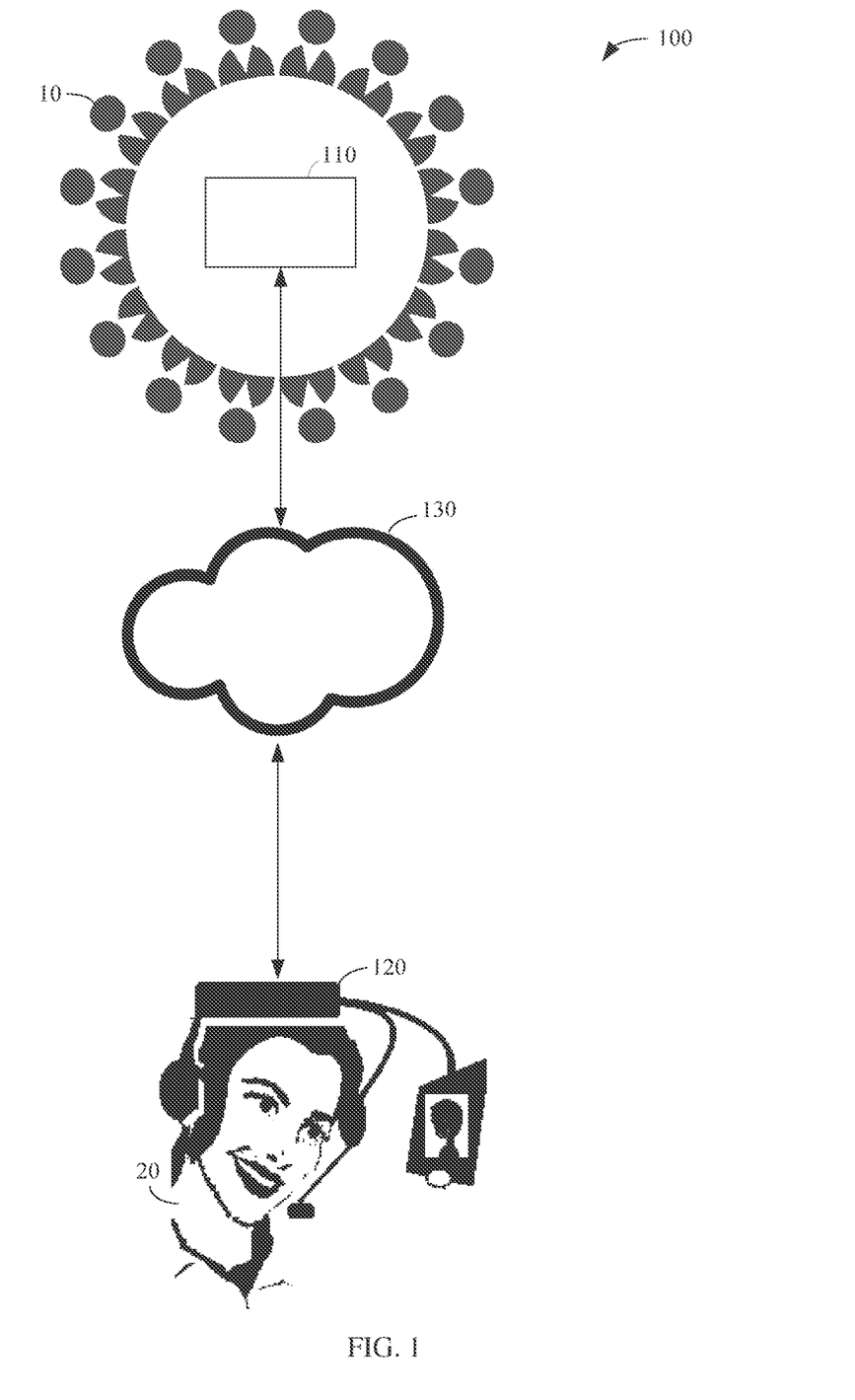
FIG. 1 is a schematic diagram of one embodiment of an asymmetric video conferencing system.

FIG. 1 illustrates a plurality of first participants 10 at a first location and a single second participant 20 at a second location. The first and second participants 10 and 20 are using an asymmetrical video conferencing system 100 for video conferencing. The asymmetric video conferencing system 100 comprises a panoramic video conferencing device 110 and a head mounted video conferencing device 120. The panoramic video conferencing device 110 is connected to the head mounted video conferencing device 120 via the network 130 and performs bidirectional communication. By way of example and not limitation, the network 130 may comprise wired and/or wireless transmission media, which may be in the form of a private network or a public network such as the Internet, or a combination of the two.

Figure 2:
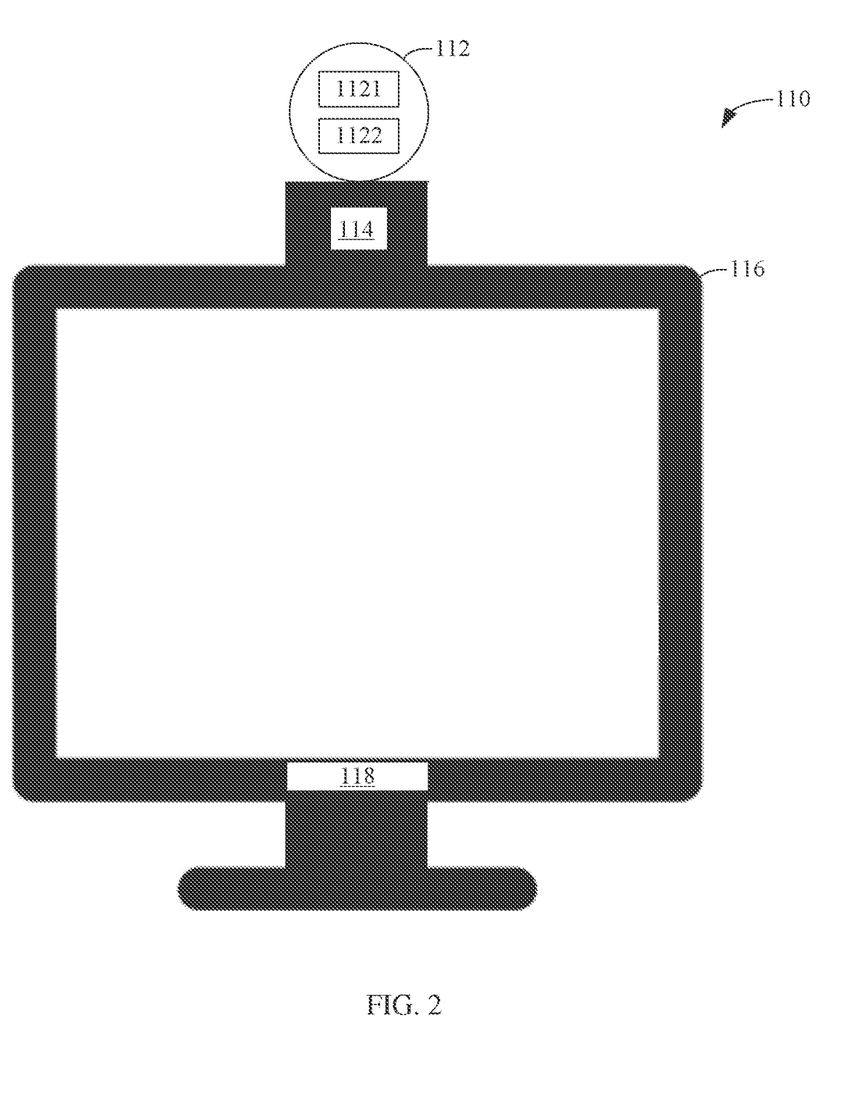
FIG. 2 is a schematic structural diagram of one embodiment of a panoramic video conferencing device.

FIG. 2 illustrates a schematic structural diagram of the panoramic video conference device 110 according to an embodiment. The panoramic video conferencing device 110 comprises a photographing device 112, a projection device 114, a display device 116, and a speaker device 118. The photographic device 112 may be any type of imaging system for capturing images of the plurality of first participants 10. In one embodiment, the photographic device 112 comprises a 360 degree camera 1121 and a microphone array 1122. The 360 degree camera 1121 is configured to acquire panoramic video of each of the first participants 10 sitting around the conference table, and the microphone array 1122 is used for real-time sound collection from a location to accurately detect a location of a current speaker in the panoramic video (for example, anywhere in an angle of 360 degrees). The projection device 114 and the display device 116 are video output devices of the panoramic video conferencing device 110 for displaying video data transmitted by the head mounted video conferencing device 120 from the second location. The projection device 114 may project the video data on a wall or a display screen around the conference room, so that the plurality of first participants 10 can view the video of the second participant 20. The speaker device 118 is a voice output device of the panoramic video conferencing device 110 for outputting voice data transmitted by the head mounted video conferencing device 120 from the second location. To facilitate obtaining a frontal image of each of the plurality of first participants 10, the panoramic video conferencing device 110 may be disposed in the center of the conference table at the first location. In general, a size of the panoramic video conferencing device 110 should not be so large as to obstruct a participant's view of other participants, so that the plurality of first participants 10 can see each other in a conference room. A height of the panoramic video conferencing device 110 should be adjusted as needed by the plurality of first participants 10. For example, in a video conference, the height of the panoramic video conferencing device 110 may be adjusted according to a height of the conference table and a seated height of each of the plurality of first participants 10.

As shown in FIG. 2, in the embodiment, the photographing device 112 is disposed at a position slightly higher than the display device 116, and is approximately at the eye height of the plurality of first participants 10. The projection device 114 is disposed between the photographing device 112 and the display device 116. The speaker device 118 can be integrated on a frame of the display device 116. In one embodiment, a base together with a support may be used to maintain relative positions of the camera 112, the projection device 114, the display device 116, and the speaker device 118 in the panoramic video conferencing device 110. In one embodiment, the position of one or more components in the panoramic video conferencing device 110 is adjustable on the support. In one embodiment, the panoramic video conferencing device 110 may further comprise a control component and a horizontal rotation mechanism, such that the display device 116 and the speaker device 118 may be rotated horizontally based on feedback of the second participant 20 and/or locations of each of the plurality of first participants 10.

Figure 3:
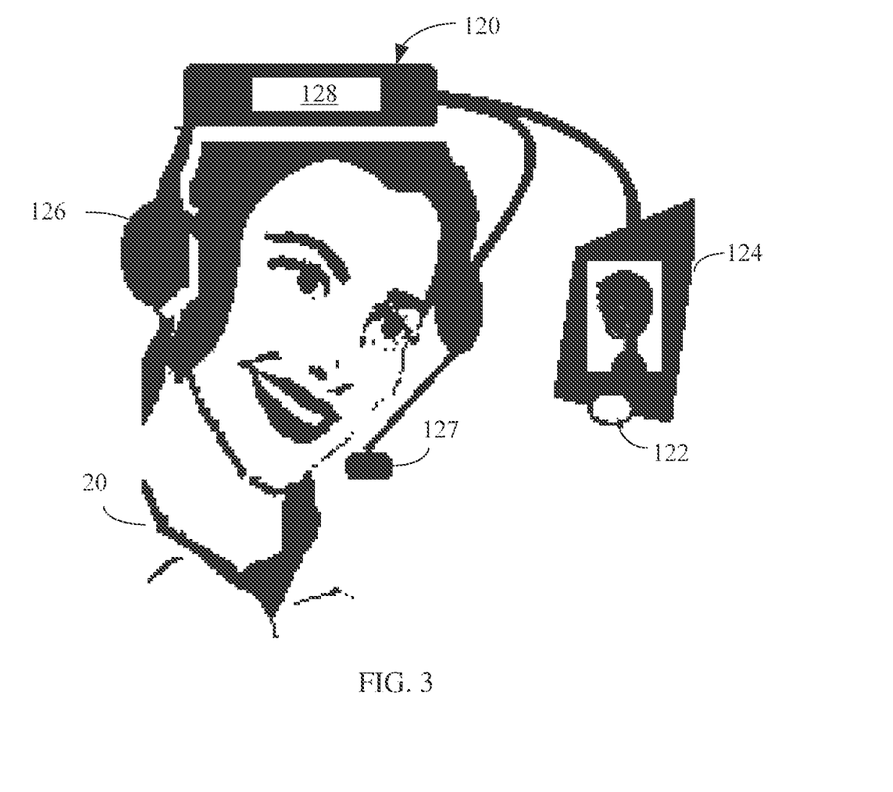
FIG. 3 is a schematic structural diagram of one embodiment of a head mounted video conferencing device in the system of FIG. 1.

FIG. 3 illustrates the head mounted video conferencing device 120 according to an embodiment. The head mounted video conferencing device 120 integrates the camera 122, the display device 124, the earphone 126, and the microphone 127, and has portability, so that the second participant 20 may participate in a two-way video conference with any of the plurality of first participations 10 in any environment. As shown in FIG. 3, the camera 122 is disposed slightly below the display device 124. In another embodiment, the camera 122 may also be disposed slightly above the display device 124. In one embodiment, the camera 122 may be mounted within the display device 124 such that the camera 122 and the display device 124 are located at approximately the same height. In one embodiment, the camera 122 is located at an approximate height of the eye of the second participant 20 to assist the first participants 10 in having a more face-to-face user experience in the video conference. In an embodiment, the head mounted video conferencing device 120 may further comprise a sensing device 128 for detecting an orientation, seated or otherwise, of the second participant 20. In one embodiment, the sensing device 128 comprises a tri-axial acceleration sensor and a gyroscope that may detect angular velocity and angular changes occurring at the head of the second participant 20.

In an embodiment, an operation mode of the asymmetric videoconferencing system 100 may comprise a face-to-face conversation mode and a general mode. The operation mode may be set by an administrator of the asymmetric video conference system 100 before the video conference, or may be changed by the administrator during the video conference, or may be changed by participants of the video conference.

If the asymmetric video conferencing system 100 is set to the face-to-face conversation mode, when the video conference starts, in one embodiment, the panoramic video conferencing device 110 acquires panoramic video data of each of the plurality of first participants 10 via the 360 degree camera 1121 of the camera device 112. A region of interest (ROI) is extracted from the panoramic video data and locations of each of the plurality of first participants 10 is acquired. In one embodiment, the ROI is initially set to a human face. In another embodiment, the ROI can also be set to comprise a head, shoulder, or other part of the body in addition to the human face. In those embodiments, recognition of the ROI in the panoramic video data may be accomplished using known ROI recognition techniques (e.g., face recognition, image recognition, or feature recognition techniques). For example, if the ROI is set as the human face, the face recognition technology is used in the panoramic video data to identify the ROI. Improvements in ROI identification are not herein disclosed, a detailed description of how to identify the ROI in the panoramic video data is omitted. In another embodiment, the second participant 20 can also change the setting of the ROI via a user interface on the head mounted video conferencing device 120 and feed back the settings of the ROI to the panoramic video conferencing device 110. In an embodiment, the panoramic video conferencing device 110 may obtain individual locations (for example, through an angle of 360 degrees) of the first participants through the identified ROI, when the ROI includes the human face. In an embodiment, the panoramic video conferencing device 110 may also perform sound source identification through the microphone array 1122 of the photographing device 112 to obtain location of the current speaker, that is, sound source location (for example, through an angle of 360 degrees). In one embodiment, the panoramic video conferencing device 110 may also use the face recognition technology to acquire the individual identities of the first participants 10 according to the pre-stored face image database, with for example, a name of each of the first participants 10. The panoramic video conferencing device 110 then transmits the ROI video data, the individual locations of first participants 10, the acquired identities, and the sound source location to the head mounted video conferencing device 120.

Figure 4:
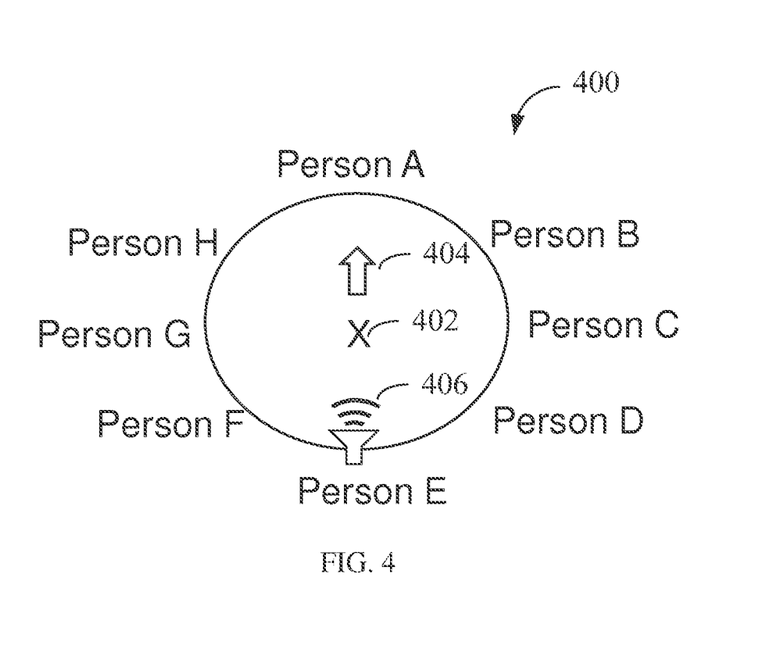
FIG. 4 is a schematic diagram of one embodiment of an indication map in the system of FIG. 1.

After receiving the video data transmitted by the panoramic video conferencing device 110, the head mounted video conferencing device 120 selects a portion of the ROI video data corresponding to one of the first participants 10 and displays the ROI video data on the display device 124. In one embodiment, the head mounted video conferencing device 120 can select a portion of the ROI video data that is initially displayed according to a preset angle and location of the each of the plurality of first participants 10. In one embodiment, the head mounted video conferencing device 120 can also use the sound source location transmitted by the panoramic video conferencing device 110 and a 360 degree virtual sound field technology to simulate audio from the sound source location. In one embodiment, the head mounted video conferencing device 120 further uses the individual location information and identity information of each of the plurality of first participants 10 transmitted by the panoramic video conferencing device 110 to establish an indication map 400. Such indication map 400 is shown in FIG. 4, and displayed on the display device 124 via a user interface. The indication map 400 helps the second participant 20 to know the identity of individuals of the plurality of first participants 10 and their relative locations. In an embodiment, the indication map 400 includes an "x" symbol 402 for indicating the location of the second participant 20. An arrow symbol 404 pointing in a direction can indicate facing direction of the second participant 20. A speaker symbol 406 can indicate the location of a sound source, that is, the location of the current speaker in the plurality of first participants 10. The locations of individuals of the plurality of first participants 10 who surround the conference table together with the identities can also be shown. In one embodiment, the indication map 400 may be displayed proximate to the lower right corner of the display device 124. In general, the indication map 400 may be displayed simultaneously with the video data, but not so as to interfere with a main view of the video data.

In one embodiment, the head mounted video conferencing device 120 may further detect the angle of rotation of the head of the second participant 20 via the sensing device 128. The detected angle can be compared with the locations of each of the plurality of first participants 10 by the head mounted video conferencing device 120 to display the portion of the ROI video data on the display device 124.

In one embodiment, the second participant 20 may also input a voice command via the microphone 127. For example, a command of "find a person G" can be given, or a gesture input of the second participant 20 can be recognized via the camera 122, for example, the second participant 20 pointing a finger to the location of the person G on the left. The head mounted video conferencing device 120 can further determine, according to the result of the voice recognition or the result of the gesture recognition, the identity and location of the one of the plurality of first participants 10 specified by the second participant 20 and display the specified ROI video data on the display device 124. In one embodiment, the ROI video data transmitted by the panoramic video conferencing device 110 is preset to include ROI video data of all of the plurality of first participants 10. In one embodiment, the head mounted video conferencing device 120 may further feed back the specified participant information to the panoramic video conferencing device 110 according to the participant information specified by the second participant 20 (e.g., by specifying location information) to enable the panoramic video conferencing device 110 to transmit the ROI video data containing only the specified participant, to further reduce the amount of data transmitted by the network.

In one embodiment, the head mounted video conferencing device 120 may also be set to a speaker mode. When set to the speaker mode, the head mounted video conferencing device 120, according to the received sound source location, that is, the current speaker in the plurality of first participants 10, selects a portion of the ROI video data corresponding to the sound source location to display on the display device 124. Then the second participant 20 can experience a face-to-face conversation with the current speaker of the plurality of first participants 10.

In one embodiment, the display device 116 and the speaker device 118 of the panoramic video conferencing device 110 may be rotated by the angle of the head fed back by the second participant 20 or the location of one of the first participants 10 that the second participant 20 desires to talk with. Thus, one of the plurality of first participants 10 and the second participant 20 can have a more immersive and face-to-face conversation experience. In one embodiment, the projection device 114 may simultaneously project video data, so that other people of the plurality of first participants 10 can see the video data at the same time.

In one scenario, the identity of one of the plurality of first participants 10 transmitted by the panoramic video conferencing device 110 may assist the second participant 20 of the head mounted video conferencing device 120 to know the identities of all participants. So, if there is a participant that the second participant 20 does not know, such as person H, during the video conference, the second participant 20 may point to location of the person H by the angle of the head rotation, or by a voice or gesture command, to clearly see the video data of the person H.

In one scenario, when the location of the current speaker of the plurality of first participants 10 is not face-to-face with the second participant 20, that is, if he does not appear on the display device 124 of the head mounted video conferencing device 120, the second participant 20 can rotate his head to the position (angle) of the analog sound source. Then the ROI video data of the speaker is displayed on the display device 124 and the second participant 20 can be face-to-face with him.

In one scenario, according to the identity information and location information of the plurality of first participants 10 transmitted by the panoramic video conferencing device 110, the second participant 20 may rotate his head, or via a voice or gesture command, specify one of the plurality of first participants 10 to be talked to, then the one's ROI video data is displayed on the display device 124. In this way, the second participant 20 can talk to any person even if that person is not speaking.

The asymmetric video conferencing system 100 can be used between a boss and an employee, or in any situation where a single person wants to perform a video conference with other single persons.

The above mentioned is the face-to-face conversation mode of the asymmetric video conferencing system 100. In another embodiment, the asymmetric video conferencing system 100 can also be set to general mode. If the asymmetric video conferencing system 100 is set to the general mode, when the video conference starts, the panoramic video conferencing device 110 supports a projection function to project the video data transmitted by the head mounted video conferencing device 120. The video data is also displayed on the display device 116 at the same time. The video data transmitted by the head mounted video conferencing device 120 can thus be seen by all of the plurality of first participants 10.

When the asymmetric video conferencing system 100 is set to the general mode, the display device 124 of the head mounted video conferencing device 120 displays the panoramic video data transmitted by the panoramic video conferencing device 110 or all of the ROI video data of the plurality of the first participants 10.

Figure 5:
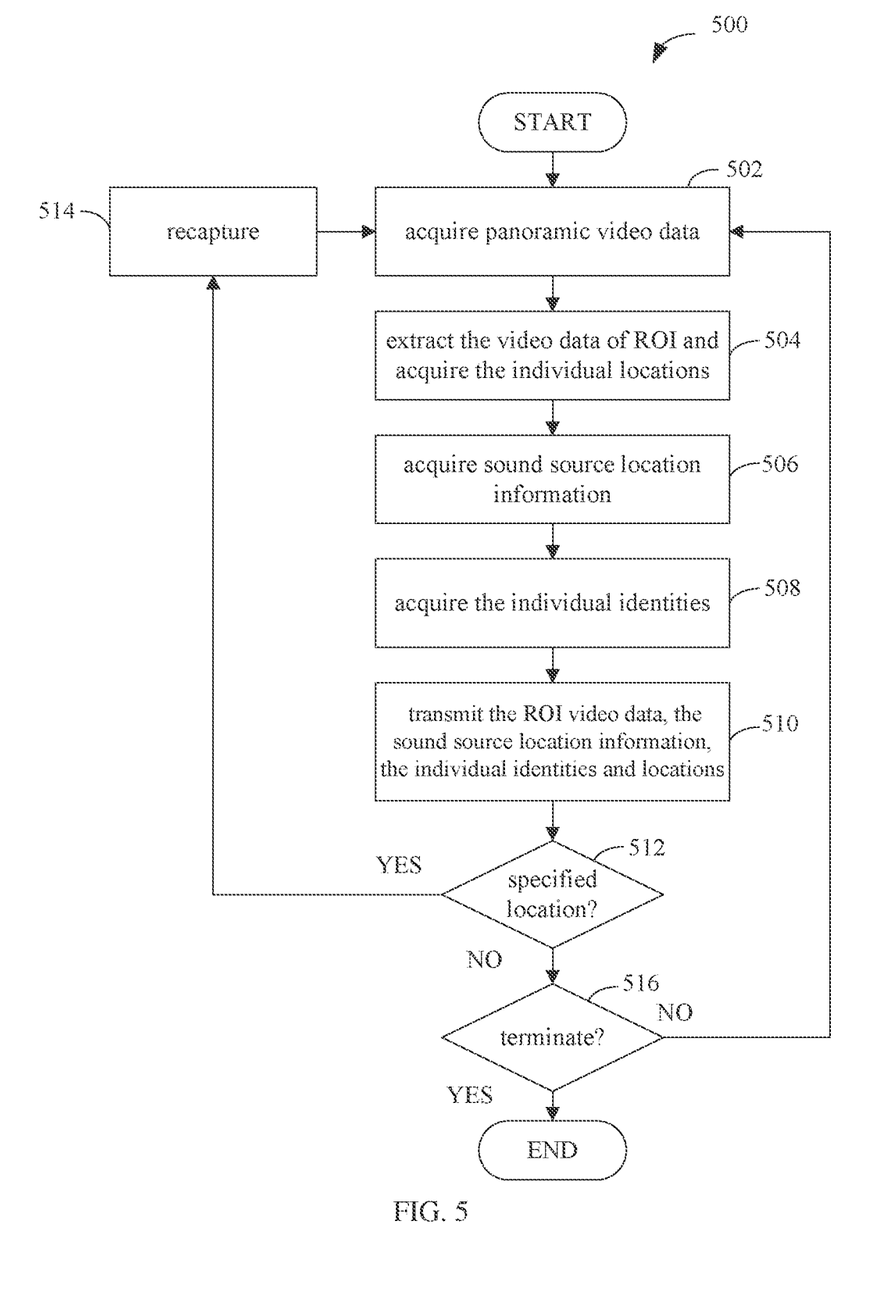
FIG. 5 is a flow chart of one embodiment of the operation of the panoramic video conferencing device in FIG. 2.

Referring to FIG. 5, a process 500 of the panoramic video conferencing device 110 is disclosed in accordance with one embodiment. The step numbers provided in the process 500 are for clarity of description, and do not represent a certain order. In other embodiments, the operations of the steps may not be implemented in the exact order shown.

The process 500 begins by receiving an instruction to start a video conference. Step 502, the panoramic video conferencing device 110 acquires panoramic video data via a 360 degree camera 1121 of the photographing device 112.

Step 504, identifies the ROI, extracts the video data of the ROI in the panoramic video data, and further acquires the individual locations of the plurality of first participants 10 according to the identified ROI. In this embodiment, the ROI is initially set to a human face. Taking the plurality of first participants 10 as an example, the ROI video data extracted by the panoramic video conferencing device 110 comprises face information of the plurality of first participants 10. In another embodiment, the ROI could also be set to comprise a head, shoulder, or other part of the body. In another embodiment, the second participant 20 could also change the setting of the ROI via a user interface and feed back the settings of the ROI to the panoramic video conferencing device 110.

Step 506, the panoramic video conferencing device 110 performs sound source identification through the microphone array 1122 of the photographing device 112, and acquires sound source location.

Step 508, the panoramic video conferencing device 110 utilizes the face recognition technology to acquire the identities (for example, names) of the first participants 10 according to the pre-stored face image database.

Step 510, the panoramic video conferencing device 110 transmits the ROI video data, the sound source location, the individual identities and the individual locations of the first participants 10 to the head mounted video conferencing device 120.

Step 512, the panoramic video conferencing device 110 further determines whether a specified location message is received. If the panoramic video conferencing device 110 receives the message, it changes to extract only the ROI video data of the specified location, and returns to step 502 to continue the video conference. If the panoramic video conferencing device 110 does not receive the message, then in step 516, it further determines whether an instruction to end the video conference is received. If the instruction to end the video conference is received, the process 500 terminates; otherwise, return to step 502 to continue the video conference.

Figure 6:
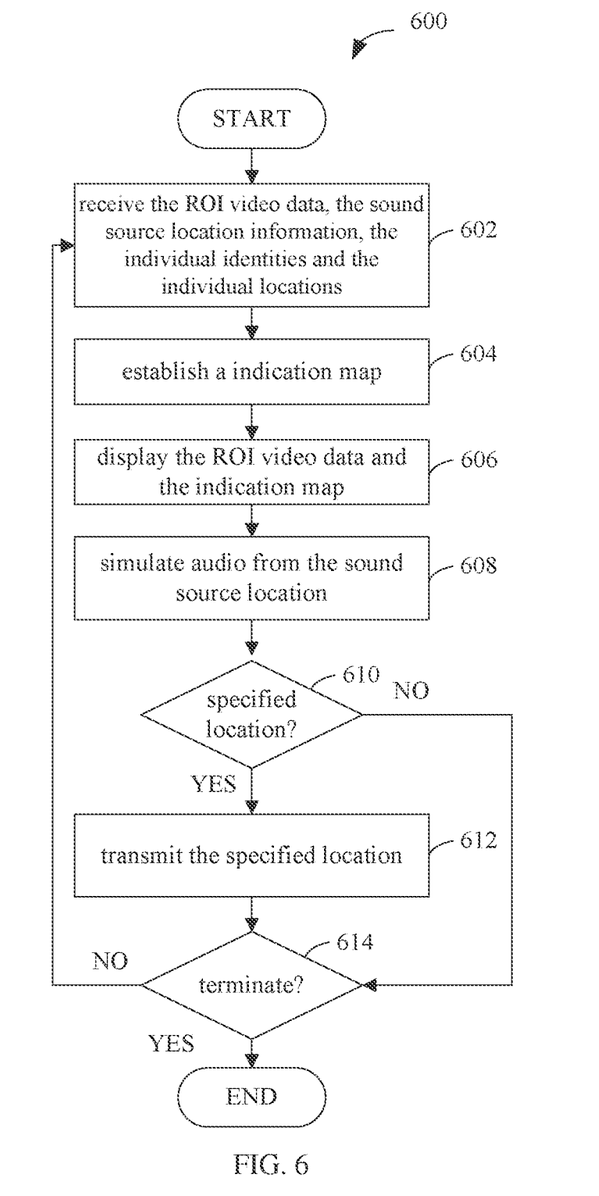
FIG. 6 is a flow chart of one embodiment of the operation process of the head mounted video conferencing device in FIG. 3.

Referring to FIG. 6, which illustrates an operational process 600 of the panoramic video conferencing device 120 is disclosed in accordance with one embodiment. The step numbers provided in the process 600 are for clarity of description, and do not represent a certain order. In other embodiments, the operations of the steps may not be implemented in the exact order shown.

The process 600 begins by receiving an instruction to start a video conference. Step 602, the head mounted video conferencing device 120 receives the ROI video data, the sound source location, and the individual identities and the individual locations of the first participants 10.

Step 604, establishes an indication map according to the received sound source location and the individual identities and the individual locations of the first participants 10.

Step 606, displays the ROI video data and the indication map on the display device 124. In one embodiment, the head mounted video conferencing device may display a portion of the ROI video data according to a preset angle and the individual locations.

Step 608, simulates audio from the received sound source location by using a 360 degree virtual sound field technology.

Step 610, detects a head rotation angle of the second participant 20 via the sensing device 128, and compares the detected head rotation angle with the received individual locations of the first participants 10. In comparison, it is determined whether the second participant 20 has given the specified location command. If the second participant 20 gives the specified location command, then in step 612, a specified location message is transmitted to the panoramic video conferencing device 110; otherwise, step 614 is executed to determine whether an instruction to end the video conference is received. In another embodiment, the head mounted video conferencing device 120 cloud determine one of the plurality of first participants 10 that to second participant want to talk and/or view according to the detected angle of rotation of the head of the second participant 20. The ROI video data of the one of the first participant 10 that is to be viewed is displayed on the display device 124. In another embodiment, the video conferencing device 120 could receive a voice command via the microphone 127 or receive a gesture command via the camera 122 to confirm the video data that the second participant 20 wants to view.

Step 614, determines whether an instruction to end the video conference is received. If received an instruction to end the video conference, the process 600 terminates; otherwise, returns to step 602 to continue the video conference.

In summary, the asymmetric video conferencing system 100 comprises the asymmetric panoramic video conferencing device 110 and the head mounted video conferencing device 120. The panoramic video conferencing device 110 transmits only the ROI video data to the head mounted video conferencing device 120 instead of the panoramic video data to reduce the network transmission data. The head mounted video conferencing device 120 could feedback the ROI information further reduces the amount of network traffic.

The embodiments shown and described above are only examples. Many other details are often found in such art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An asymmetric video conferencing system, comprising:
    a panoramic video conferencing device, comprising;
        a 360 degree camera adapted for acquiring a panoramic video data of a plurality of first participants;
        a first display device; and
        a speaker device; and
    a head mounted video conferencing device, comprising:
    a second display device; and
        a camera adapted for receiving a gesture command, wherein
    the panoramic video conferencing device is adapted for identifying a region of interest (ROI) in the panoramic video data, where in the region of interest is a face region, extracting video data of the ROI, acquiring, according to the ROI, locations of each of the plurality of first participants, and transmitting the video data of the ROI and the locations of the plurality of first participants to the head mounted video conferencing device, wherein the locations are angles of each of the plurality of first participants;
    the head mounted video conferencing device is adapted for receiving the video data of the ROI and displaying the video data of the ROI on the second display device, transmitting a preset angle and an angle determined from the locations of each of the plurality of first participants according to the received gesture command to the panoramic video conferencing device; and
    the panoramic video conferencing device is further adapted to horizontally rotating the first display device and the speaker based on the preset angle and the determined angle received from the head mounted video conferencing device.

2. The system of claim 1, wherein the head mounted video conferencing device, after receiving the video data of the ROI, is adapted for further selecting a portion of the video data of the ROI based on the preset angle and the locations of each of the plurality of first participants and displaying the portion of the video data of the ROI on the second display device.

3. The system of claim 1, wherein the panoramic video conferencing device is further adapted for re-extracting the video data of the ROI based on the preset angle and the determined angle received from the head mounted video conferencing device and transmitting the video data of the ROI which has been re-extracted to the head mounted video conferencing device.

4. The system of claim 1, wherein the panoramic video conferencing device further comprises a microphone array adapted for locating a sound source location, the panoramic video conferencing device is further adapted for transmitting the sound source location to the head mounted video conferencing device, and the head mounted video conferencing device is further adapted for simulating audio from the sound source location.

5. An asymmetric video conferencing method adapted for a video conferencing system, wherein the video conferencing system comprising a panoramic video conferencing device, and a head mounted video conferencing device, the panoramic video conferencing device comprising a display device and a speaker device, the method comprising:

acquiring a panoramic video data of a plurality of first participants by the panoramic video conferencing device;

extracting a video data of a region of interest (ROI) from the panoramic video data and acquiring locations of each of the plurality of first participants by the panoramic video conferencing device;

transmitting the video data of the ROI and the locations to the head mounted video conferencing device by the panoramic video conferencing device;

displaying a portion of the video data of the ROI according to a preset angle and the locations by the head mounted video conferencing device;

transmitting the preset angle and an angle determined from the locations of each of the plurality of first participants according to a gesture command received by the head mounted video conferencing device to the panoramic video conferencing device by the head mounted video conferencing device; and     rotating the display device and the speaker horizontally based on the preset angle and the determined angle by the panoramic video conferencing device.

\* \* \* \* \*